Patented Apr. 2, 1935

1,996,372

UNITED STATES PATENT OFFICE 1,996,372

HYDRAULIC COMPOSITION

Harry F. Gardner, Snyder, N. Y., assignor to Certain-Teed Products Corporation, New York, N. Y., a corporation of Maryland No Drawing. Application January 30, 1933, Serial No. 654,254

48 Claims. (Cl. 106—34)

This invention relates to materials used in the plastic arts and especially to plasters made of calcined gypsum used in molding processes and in making casts.

Materials used in the plastic arts such as calcined gypsum, cements, clays and similar materials, are used in various mixtures and compositions for the purpose of forming molds in which to cast objects of plastic or other composition or are used for the material of the cast itself, when formed in a mold of suitable construction. Calcined gypsum or plaster of Paris has commonly been used because of its cheapness and its ability to absorb water of crystallization and rapidly set, as well as because of its property of filling out the mold in setting to produce sharp outlines. Among other fields of use of calcined gypsum for casting plasters, it has found a special application in the so-called dental plasters used by dentists in the process of making casts, investments and in other dental work.

While calcined gypsum as ordinarily heretofore manufactured has found wide use for the purpose of making casts, certain disadvantages to be discussed hereafter have existed in its use, more especially those resulting from the necessary use with the plaster of an amount of water adequate to form a mortar or slurry of proper mobility. This mobility is that provided by a consistency of the mortar or slurry which is designated as the "pouring" consistency as distinguished from the "testing" consistency hereafter described. An excess of water over that required to supply the water of crystallization is necessary to produce this "pouring" consistency.

The use of water in sufficient quantity to provide the proper mobility acts to produce voids in the cast. These voids are the spaces left when the water, in excess of that which is required to combine as water of crystallization with the calcined gypsum in the process of setting, evaporates. These spaces in the set gypsum exist between the crystals and cause a reduction of the density and of the hardness of the cast. In the endeavor to limit the amount of water required for making mortars and slurries of calcined gypsum, various suggestions heretofore have been made for reducing the "water carrying capacity", that is, the amount of water required to produce a given consistency in the mortar or slurry of calcined gypsum and water. Such suggestions have included the use of a deliquescent salt and the calcination of the gypsum under reduced pressure.

While for many purposes the "aging" of gypsum, which occurs when the calcined product is stored for extended periods of time, or which may be produced by artificial methods such as those just mentioned, is a disadvantage, for other purposes including its use for casting plaster for some uses, it is of advantage that the calcined gypsum shall be of low water carrying capacity. It is desirable, for example, that such casting and pottery plasters, when used as molds, be prepared so as to have as much hardness, strength and resistance to wear as possible. However, a certain amount of porosity or void space in the structure of the mass of the molds is necessary in order to absorb water from the clay slip or other materials from which are manufactured pottery, terra cotta, etc. when such pottery or terra cotta products are molded in gypsum molds. In other words, for some purposes certain properties of absorption are desirable in a gypsum cast or mold and the plaster must not be of too low water carrying capacity, as in such case the cast will have a greater density than will give best results. For other purposes such as statuary or dental work where as hard, strong and dense a cast as possible is desired and when water absorptive properties of the finished casting are of no consequence, it is desirable to reduce the water carrying capacity of the calcined gypsum to a much lower degree than has been obtained in the manufacture of the casting and molding plasters now available.

One object of the present invention, therefore, is to provide a process of treating gypsum so that when calcined it will have a low water carrying capacity.

Another object of the invention is to provide an improved composition of low water carrying capacity containing calcined gypsum for use in making casts and molds.

Another object of the invention is to provide a process of producing a composition containing calcined gypsum, which composition has a lower water carrying capacity than that resulting from the process to which a given gypsum is normally subjected to produce casting or molding plaster.

A further object of the invention is to produce a casting plaster of such composition that it will have a low water carrying capacity and will produce dense casts of high compressive strength and presenting a hard surface.

A further object of the invention is to provide a composition plaster requiring much less water to produce the desired workable consistency of the mortar or slurry used to form a cast than is possible with usual plasters.

A further object of the invention is to provide a method of making plaster casts with a much reduced amount of the water used in forming the mortar or slurry as compared to present practice.

A still further object of the invention is to provide a method and means of controlling the density and water absorbing properties of a mold or cast of calcined gypsum.

The invention is, therefore, broadly concerned with the modification of that characteristic of plaster which requires a certain amount of water to produce a given consistency and which, as above stated, is designated as the "water carrying capacity". The process of the present invention and the products resulting from the process constitute an improvement upon the processes and products heretofore known. The process of the present invention and the combination of materials which are proposed according to the invention may be utilized in connection with any ordinary gypsum, to improve, i. e., to reduce the water carrying capacity of the plastic material or calcined gypsum, especially for use in mortars or slurries for making casts and molds. It is possible by the process of my invention and with the substances or agents which I utilize so to reduce the water carrying capacity of any of the ordinary plasters which are used for casting, statuary, pottery, dental or molding plasters as well as of such materials as Keene's cement and other low water carrying plasters known to the trade, that much less water than heretofore has been necessary will be required to produce with these materials a given consistency and especially to produce the "pouring" consistency or the working consistency necessary to make a mold or to form a cast which will fill out a mold. Moreover, there will be produced a cast of increased density and strength and one which will resist abrasive wear to a greater degree.

I have discovered that when certain materials are mixed with calcined gypsum in limited amounts and in suitable relation to each other, there is produced a marked modification of the workability or flowability of the plastic mass made by the mixture of water with the calcined gypsum. These materials acting with each other and with the gypsum have the property of modifying and especially of reducing the water carrying capacity of the calcined gypsum with the resultant limitation and especially the reduction of the amount of water necessary to form the mortar or slurry of proper consistency, usually of "pouring consistency", in making molds or casts. I attribute their action in part to the modification of the surface energy in the solid liquid interface of the crystals of the gypsum or of the gypsum particles and in part to modification of molecular action of these materials as constituents of the composition by their combination with each other and with the calcined gypsum.

In my prior application Serial No. 554,068, filed July 30, 1931, of which the present application is a continuation, I have disclosed the materials which broadly I utilize in carrying out my invention. These materials are grouped in two main classes and broadly my invention resides in the combination with calcined gypsum of a material from each class as an ingredient of a plaster or a mortar or slurry. While my experiments have indicated certain separate actions of the materials of each class, I have found that broadly the combination of a material classifiable as a carbohydrate or a saccharide and one classifiable as an alkaline material produce the results which it is the object of the invention to obtain. The carbohydrates or saccharides are organic compounds synthesized by plants and comprise groups of compounds having a range of compositions. These groups include the simple sugars or mono-saccharides, the disaccharides, the trisaccharides, the tetrasaccharides and the polysaccharides. In said prior application Serial No. 554,068 I have disclosed that I may use materials which may be designated as alkalies and have stated that such alkalies may include bases of the alkali metals or their equivalents or of the alkali earths. In the present application I include such materials as are of alkaline character or have an alkaline reaction and which may comprise salts which have such alkaline characteristics.

In said prior application I have also stated that the materials which I have found suitable for this purpose and which are classified as saccharides include the substances known as starch derivatives comprising the range of substances from starch to the sugars and that among the materials in the polysaccharide group of the saccharides are the water soluble gums which are produced by the natural exudation of certain trees. Gum arabic is a well known gum of this type and is suitable for the composition plaster of my invention. I also suggested other materials such as dextrine which I have found to be effective to certain degrees and which fall in the group of polysaccharides. Other materials which are intermediate in the range of conversion of starch into sugar by hydrolysis or other means I suggested also as being suitable. Among these are the disaccharides such as lactose, sucrose and maltose. I also found that materials which fall in the sugar group itself, the monosaccharides, such as glucose and fructose, to some degree are effective to produce the desired result. Among common materials falling in these groups which I used may be mentioned mucilage, cane sugar, maple syrup, strained honey and molasses.

All of these materials are representative of the carbohydrate or saccharide group. In my prior application I stated that I found, however, that certain of the materials so classified were of greater advantage than others. For example, as a result of my experiments and tests I found that of the water soluble natural gums, gum arabic is preferable as it is especially effective in producing the desired results and is of practical commercial value for the purpose because of its cheapness and availability. This gum is obtained from different varieties of the Acacia or Hashab tree and is known under the name of Acacia, Senegal, Morocco, Cape Australian or Wattle, White Sennar, etc. Also, for example, of the materials falling in the group of sugars my experiments show that sucrose, while somewhat retarding the setting of the cast, acts to reduce materially the water carrying capacity of calcined gypsum when used according to my invention. It will be understood, however, that these materials lie in the range of the saccharides and they, as well as other members of this class, are effective for the purpose of my invention and are included therein.

Of the alkalies which, as disclosed in said prior application, are suitable as a cooperating agent with the saccharides to produce the result obtained by my invention, I have found that lime, calcium oxide, hydrated lime or calcium hydroxide is especially effective. Other alkalies such as potassium hydroxide, sodium hydroxide and barium hydroxide and other or equivalent alkaline compounds may be used.

The present invention is concerned with the same class of materials and with the same objects as is said prior application Serial No. 554,068 and is equally applicable to all the various classes of plastic materials, including plasters of calcined gypsum in their various forms to which said prior invention is applicable. The broad object of the invention, as in said prior application, is to provide a plaster with which only a relatively small amount of water need be used to produce the desired pouring consistency necessary to make a mold or form a cast which will fill out a mold. The advantages of increased density and strength and resistance to abrasive wear are also obtained by the present application and in more marked degree.

To produce the desired results above described broadly it is only necessary that there shall be incorporated with the calcined gypsum a material from each class before or during the mixing of the mortar or slurry from which the cast or mold is to be made. The materials above classified are water soluble or may be mixed with the water used for making the mortar or slurry. Preferably, however, the materials are thoroughly mixed with the calcined gypsum in the dry state. In using the composition proposed in said prior application, gum arabic, for example, may be prepared in powdered form as may also hydrated lime. These agents of my invention can therefore be thoroughly incorporated in a plaster composed of calcined gypsum and these ingredients. In this form the plaster is ready for use by the admixture of water. As it is possible to mix the ingredients in proper proportions during the manufacture of the plaster, the control of the quality of the composition plaster and of its composition for special results is thus also possible. No further modification of the mixture is then necessary at the place of use. In this form also it is convenient for shipping.

In forming the composition plaster of my invention only relatively small proportions of the material from the saccharide group and of the alkali are necessary to produce the desired results. For example, when a small amount of gum arabic and of lime to the degree of a total of 2% are mixed with calcined gypsum, it is possible markedly to reduce the water carrying capacity of the plaster with a corresponding increase in the density and strength of the casts or molds made therefrom. These results are obtained while retaining in the plaster the quality of forming a slurry or a mortar of proper workability and having the desired plastic qualities necessary for casting plasters.

As a simple illustration of the effects of the agents which I use according to my invention, a test may be made as follows: When 100 grams of dry plaster normally requiring about 50 grams of water to produce the consistency of a paste are mixed with water and to this mixture 2 grams of powdered gum arabic are added and thoroughly mixed, the consistency of the paste becomes somewhat thinner while still retaining its paste condition. If now there is thoroughly stirred into this mixture ½ gram or 1 gram of hydrated lime or other alkali, the mass loses its paste consistency and becomes extremely fluid so that it will pour like paint or cream. Again, if 100 grams of the same plaster in dry form are mixed with 36 grams of water, there will not be enough water to form a paste and there will result a damp mass of plaster which balls up in lumps in the mixing vessel. If into this mass there is thoroughly stirred 2 grams of gum arabic alone, the paste-like consistency is not produced. Moreover, if the ½ gram to 1 gram of lime alone is added to the balled-up mass of plaster, it still is not possible to produce the paste-like consistency. If, however, both the ½ gram to 1 gram of lime and the 2 grams of gum arabic are added to the balled-up mass and are thoroughly mixed therewith, the mass loses its balled-up condition and will become thinner than the paste-like consistency and will pour like cream. Similarly, if 2 grams of gum arabic and ½ gram to 1 gram of lime are mixed in the 36 grams of water before adding the water to the original 100 grams of dry plaster, upon mixing vigorously a viscous mass is produced which will pour from the mixing vessel and also is of a consistency similar to that of paint or cream.

In other words, not only has the mixture thus produced been thinned without addition of excess water, but a "pouring consistency" has been produced with less water than is normally required to produce a paste-like consistency. This mixture is self-leveling and when a knife blade is drawn through the mass the separated portions will flow together again and finally the mark of the blade will disappear and the surface become smooth.

I have found also that I may use with a saccharide such as a water soluble gum, and particularly with gum arabic, certain other materials which may include a material of alkaline character, which materials in combination with the gum arabic are effective to reduce the amount of water necessary to produce with the plaster a mortar or slurry of pouring consistency. The materials which I now propose for combining with the saccharide are typified by the materials litharge and soda ash. I have found not only that the use of the lead compound, litharge, alone in combination with gum arabic effects a lowering of the amount of water necessary to produce the testing consistency and correspondingly the pouring consistency, but also I have found that the combination of litharge with the alkaline material, for example, soda ash, together with gum arabic, produces a still greater reduction of the water carrying capacity. I have also found that I may substitute for the soda ash certain other alkaline materials such as lime, caustic soda or caustic potash.

I am aware that heretofore plasters have been proposed containing litharge and sodium carbonate. In such plasters, however, the litharge is used with other ingredients, for example, oil cake meal, to increase the cementing properties of the plaster as well as its fire-resisting properties. In such composition as heretofore proposed the soda ash is acted upon by another ingredient, for example, cream of tartar, to give off carbonic acid gas for the purpose of lightening the material. It is clear that in such prior compositions neither the lead compound, that is the litharge, nor the alkaline material, that is the soda ash, is free to act with the gypsum and with the saccharide to produce the results which are obtained by the composition of my invention.

In order to show the results obtained by my invention, the following explanation and tests are given:

In the standards of the American Society for Testing Materials under Designation C–2630 for the standard method of testing gypsum and gypsum products, the definition of "testing consistency" is given as follows:

"A neat mortar shall be considered of testing consistency when a penetration of 30 mm. plus or minus 2 mm. is obtained when tested in accordance with section 16 and the testing consistency shall be expressed as the number of cubic centimeters of water required to be added to 100 grams of the gypsum."

It will be clear from this definition that a standard is set forth by which to test physically the resistance offered by a mortar of whatever composition when mixed with a vehicle such as water. The water carrying capacity or the amount of water necessary to bring a mixture of calcined gypsum and water or other mortars to testing consistency is designated by the number of parts of water by weight which must be added to 100 parts by weight of the dry calcined gypsum in order to offer the resistance under test as indicated in the definition. For example, the "testing consistency" of ordinary calcined gypsum is usually obtained by mixing from 60 to 80 parts of water with 100 parts of calcined gypsum by weight. As has been mentioned above, casting plasters have been produced heretofore by various methods and in such plasters it has been possible heretofore to produce a mixture of "testing consistency" by the addition and incorporation of from 54 to 60 parts of water to 100 parts of plaster by weight. In order to utilize such casting plasters for the purpose of making casts or molds, it is frequently necessary to bring the mortar to a pouring consistency which is accomplished by mixing the plaster with an amount of water greater than that required for "testing consistency". For example, between 65 and 75 parts of water may be required with such casting plasters as heretofore produced in order to obtain the proper "pouring consistency" which is normally required in order to pour the material into a mold in the manufacture of pottery, statuary, ornamental plaster and for certain dental uses. Such a consistency may be described as approximately that of a very thick paint. When casts as heretofore made from such material are poured with the "pouring consistency" above mentioned, the resultant compressive strength of the dried casts is between 1500 and 2000 pounds per square inch.

In comparison with the results obtained with ordinary casting plaster, I have found with the materials as set forth in said prior application Serial No. 554,068 that it is possible to reduce by a third or more the amount of water required to produce "testing consistency" and similarly to reduce by about one-half to one-third the amount required to produce "pouring consistency". At the same time the compressive and tensile strength of the cast is materially increased as well as the hardness, weight and density. For example, I have found with a certain casting plaster commonly in commercial use that a testing consistency of from 54 to 60 is obtained. With this casting plaster, I have mixed powdered gum arabic and hydrated lime in the proportions shown in the following table with the results given in this table.

Formula 1

| | |
|---|---|
| Casting plaster (98% thru 100 mesh sieve) | 98.5% |
| Powdered gum arabic | 1.0 |
| Hydrated lime | .5 |
| Testing consistency | 43 |
| Pouring consistency | 46 |
| Compressive strength at pouring consistency | 3000 lbs. per sq. in. |

It will be apparent from the results given in this table that the "testing consistency" has been reduced from an average of 57 to 43. Likewise a reduction in the "pouring consistency" from 70 to 46 has been obtained as will be understood from the above explanation. In addition the strength, density and hardness have been raised to a marked degree. Furthermore, casts obtained in using the casting plaster of the composition of Formula 1 at "pouring consistency" were dense and strong and presented a hard, smooth surface.

As described in said prior application Serial No. 554,068, I have further found that still better results are obtained with ground gypsum which is in a more finely divided state than that used in Formula 1. When the casting plaster is ground so as to pass 99.3% thru a 100 mesh sieve as compared with 98% thru a 100 mesh sieve as indicated in Formula 1, the testing consistency and the "pouring consistency" are further reduced as indicated in the following table, while the density and strength are increased.

Formula 2

| | |
|---|---|
| Casting Plaster (99.3% thru 100 mesh sieve) | 98.5% |
| Powdered gum arabic | 1.0 |
| Hydrated lime | .5 |
| Testing consistency | 40 |
| Pouring consistency | 43 |
| Compressive strength at pouring consistency | 3500 lbs. per sq. in. |

As disclosed in said prior application, casting plasters of a still lower "testing consistency" with a corresponding increase in strength, hardness and density can be obtained by somewhat increasing the proportions of gum arabic and lime when mixed with the finely ground casting plaster. As examples of the effect of different proportions of the materials which I utilize in my composition casting plaster and to show the effect of variations in the amount of gum arabic and of lime in combination with the casting plaster with which the gum arabic and lime are mixed, the following formulas are given.

Formula 3

| | |
|---|---|
| Casting plaster (99.3% thru 100 mesh sieve) | 98.0% |
| Powdered gum arabic | 1.5 |
| Hydrated lime | .5 |
| Testing consistency | 38 |
| Pouring consistency | 41 |
| Compressive strength at pouring consistency | 4000 lbs. per sq. in. |

Formula 4

| | |
|---|---|
| Casting plaster (99.3% thru 100 mesh sieve) | 96.35% |
| Powdered gum arabic | 2.00 |
| Hydrated lime | 1.00 |
| Powdered potassium sulphate | 0.65 |
| Testing consistency | 35 |
| Pouring consistency | 38 |
| Compressive strength at pouring consistency | 4500 lbs. per sq. in. |

As the combination of gum arabic or similar gum with the hydrated lime or similar alkali retards the setting time of the casting plaster or calcined gypsum to some extent, it is at times necessary to add an accelerating material to the above formulas to obtain the quick set necessary for certain uses. For example, the addition of 0.65% powdered potassium sulphate as shown in Formula 4 results in a setting time of approximately 15 minutes whereas this same formula without the accelerating chemical sets in approximately 1 hour. The setting time of these plasters as given in the above or similar formulas can be readily controlled by the addition of ordinary commercial retarder or other retarding agents if it is desired to retard the set, or by the addition of the common accelerators such as ground raw gypsum, potassium sulphate, zinc sulphate, etc., if it is desired to hasten the set. The usual methods of control of the set as commonly known and practiced are applicable in the use of the composition plaster of my invention.

Within limits, still higher percentages of powdered gum and alkali may be used if it is desired to lower still further the water carrying capacity of the plaster, thereby increasing the weight and density of the resulting cast. Also lower percentages may be used to obtain a certain improvement. I have found that to obtain practical results ranges of percentages as follows for the different materials may be used to produce the desired degree of water carrying capacity in a casting plaster without adversely affecting the strength or the setting time to an unsatisfactory degree:

Gum arabic _____ .4–3.0%
Lime _____ .2–3.0%

Formulas 1, 2, 3 and 4 above, however, show preferred combinations.

It is to be noted that these percentages are based on the dry weight of the plaster before mixing with the water to form a mortar or slurry. While in the formulas given above the percentage of calcined gypsum in the composition is not less than 96%, as will be hereafter described it is within the range of my invention to incorporate certain fillers or inert materials, in which case the percentage of the calcined gypsum in the whole mixture becomes less. In general, however, the amount of calcined gypsum which is used in my composition plaster is predominant and forms the cementitious material. In most cases the calcined gypsum substantially alone forms the cementitious material and will be in excess of about 75% of the weight of the dry mixture of the composition plaster. It will be clear also that the relation of the main ingredients shown in the formulas may be maintained while adding thereto the inert materials.

As may be noted in Formulas 1, 2, 3 and 4 and also in the range of percentages given above, the relation of the gum arabic to the lime or similar alkali is not less than 1. Although reduction of the water carrying capacity may be effected with amounts of lime somewhat greater than that of the gum arabic, usually the percentage of gum arabic is greater than that of the lime. It will be noted also from said formulas that the ratio of the gum arabic to the lime is between 1 to 1 and 3 to 1. The invention is not limited to said particular ratios and certain improvements may be made with other ratios. Preferably the ratio of the gum arabic to the lime, that is, of the saccharide to the alkali, is kept within the range of ratios of from 1 to 1 to 4 to 1 as the setting time and the hardness of the surface and other physical characteristics desired in the cast then are not unduly interfered with. The invention is not concerned with plaster in which relatively large amounts of lime are used as in wall plasters or lime plasters as such compositions are unsuitable for casting plasters. The amount of calcined gypsum to be used is such that substantially alone, and taking into consideration the filler materials, it will act as the cementitious material. Broadly the amounts of the saccharide and of the alkaline material are so balanced with respect to each other while maintaining the calcined gypsum in predominant amount that they may act together so that less water will be required to produce a given consistency than when either of said two ingredients is used alone.

Ordinary calcined gypsum of a naturally much higher water carrying capacity as compared with so-called casting plaster may be used in compositions according to the above or similar formulas with a corresponding reduction of its water carrying capacity, but a plaster with a low water carrying capacity is to be preferred when a dense, hard cast is desired, as the addition of the materials according to my invention still further reduces the water carrying capacity of the plaster and very low "testing" and "pouring" consistencies are obtained.

The gum and alkali in the composition plaster of my invention, such as those indicated in the above or similar formulas, are preferably weighed and thoroughly mixed with the calcined gypsum or casting plaster at the plaster mill in a Broughton or other effective mixing device, a retarder or an accelerator being added if desired. Similar results, however, may be obtained by adding the gum and alkali to the lump gypsum or ground gypsum before or during the calcination necessary to produce calcined gypsum or casting plaster. Moreover, the reduction in water carrying capacity will result if the gum and alkali are incorporated with the plaster immediately before use or if they are added to the water before the calcined gypsum is mixed therewith. All these methods of treatment of gypsum or calcined gypsum or plasters or mortars or slurries made therefrom are comprised in the present invention.

As a further example of the results which it is possible to obtain according to my invention, I have found that calcined gypsum products having the lowest water carrying capacity known in the art, such as Keene's cement and other special calcined gypsum products which have a water carrying capacity of from about 36 to 44, may be treated to reduce still further their "testing consistency" and correspondingly the amount of water required to produce the desired "pouring consistency". When such materials are substituted for the casting plaster or calcined gypsum designated in the above formulas, the water carrying capacity may be reduced for these special forms of calcined gypsum to a range of from about 27 to 34 with corresponding increases in density, hardness and durability.

In addition to the advantages of reducing the amount of water required to produce a workable mixture, the mass of the mortar or slurry used in the cast has a greatly increased flowability so that the plastic mass is self-leveling. This property not only assists in filling out the recesses and undercuts in the mold but is advantageous in decreasing the amount of work and attention which it is necessary to give to the molding process to insure filling out of the mold, the removal of air pockets, the elimination of large voids in the casting, and the general ease of carrying on the operation of making a cast. In addition, the presence of gum arabic or other material of the class described above improves the surface finish of the casting which acquires a case hardening effect. This case hardening effect which gum arabic alone produces has been heretofore known and it is believed that to some degree the gum arabic apparently concentrates upon the surface of the cast during the process of drying, tending to fill the voids and acting with the gypsum to harden the surface of the cast itself. This action and the case hardening effect are not prevented by the combination with the gum arabic or other saccharide of the lime or other alkali.

In my investigations I have discovered that while the use of any of the materials above suggested, including the preferred materials such as gum arabic and lime, gum arabic, litharge and soda ash, or other combinations, produces the described results of lowering water carrying capacity with any calcined gypsum plaster, and while the improvements can be obtained with casting plaster of calcined gypsum normally having a relatively low water carrying capacity as compared with plasters for other purposes, still better results may be obtained in another phase of my invention by using highly plastic calcined gypsum, especially if at the same time the plaster initially may have or may be given a relatively low water carrying capacity by other methods. This highly plastic form of calcined gypsum may be produced by tube milling or ball milling of calcined gypsum in the condition as it leaves the calcining kettle. In making my investigations, for example, I have found that, using as raw material a gypsum of given characteristic to produce calcined gypsum, a plaster having a testing consistency of 48 cc. of water per 100 grams of dry plaster and a pouring consistency of 62 cc. of water per 100 grams of dry plaster may be obtained. A marked improvement may be secured by the use of the materials of my invention when mixed with said plaster as ordinarily prepared. When, however, after the calcining operation, said plaster is first made more plastic by any well known method, for example by subjecting it to the action of a tube mill or ball mill, the initial testing consistency increases to 52 cc. of water per 100 grams of plaster and the corresponding pouring consistency increases to 78 cc. of water per 100 grams of plaster. While in the present example, as shown by these figures, the testing consistency is increased by the tube milling, with gypsum of other characteritiscs the testing consistency may remain constant or may even be decreased. However, the pouring consistency in all cases tends to be increased with increase of plasticity. Heretofore, therefore, those skilled in the art would not choose a highly plastic plaster for the purpose of making castings or molds for the reason that too much water would be required to produce pouring consistency with the resulting weakness of the cast, lack of hardness and density and other faults, as mentioned above.

Nevertheless, in spite of this adverse effect caused by increased plasticity resulting from tube milling or any other process, i. e., the increased amount of water necessary to produce pouring consistency, by combining with such highly plastic or tube milled plaster the materials of my invention, and particularly gum arabic and the lead compound such as litharge and the alkaline material such as soda ash, I am able to reduce both the testing consistency and the pouring consistency below that which may be obtained when the materials of my invention are used with said plaster when it has not been subjected to the action of the tube mill or treated in any other way to increase its plasticity.

As examples of the results which I have obtained with both normal calcined gypsum and with tube milled calcined gypsum in the use of particular materials according to my invention, the following table is given:

|  | Calcined gypsum not tube milled | | Calcined gypsum tube milled | |
| --- | --- | --- | --- | --- |
|  | Consistency | | Consistency | |
|  | Testing | Pouring | Testing | Pouring |
| Alone, no addition | 48 | 62 | 52 | 78 |
| Plus 2% gum arabic and 3% litharge | 38 | 46 | 35 | 45 |
| Plus 2% gum arabic, 3% litharge, and 0.1% soda ash | 34 | 41 | 29 | 35 |

It will be noted from this tabulation that whereas the testing consistency of the plaster which has not been tube milled initially is 48 testing consistency, the testing consistency falls to 34 when gum arabic, litharge and soda ash are added in the percentage given. Correspondingly the pouring consistency of 62 is reduced to 41. However, when the normal product of the kettle, that is, the same calcined gypsum for which the results are shown in the two left hand columns, is first tube milled before admixture of the materials of the invention, the initial testing consistency of the plaster, namely 52, although higher than that of the normal calcined gypsum, is reduced to 29 and the initial pouring consistency of 78 for said tube milled plaster is reduced to 35. With different plasters of different initial testing and pouring consistencies different results will be obtained, but the unusual result shown by the tabulation is that by tube milling the plaster or otherwise increasing its plasticity a lower testing and pouring consistency may be obtained with the use of the materials of my invention in spite of the increase in the testing and pouring consistency which is produced by the milling operation.

While in the above tabulation certain preferred percentages of the gum arabic and of the litharge and of soda ash are given, from my investigations I have found that the range of percentages which may be used for these various materials is about as follows:

Gum arabic _____ .50% to 10%
Litharge _____ .50% to 10%
Soda ash _____ .01% to 2%

A practical range for calcined gypsum suitable for casting purposes would be about as follows:

Gum arabic _____ .50% to 3.0%
Litharge _____ .50% to 5.0%
Soda ash _____ .05% to .2%

These ranges of percentages will apply as well to the calcined product of normal plasticity as to the more highly plastic tube milled calcined gypsum, whether or not the water carrying capacity initially is relatively high or low, to effect reductions of the water carrying capacity of which the table given above is indicative.

The following is a formula which has been developed for commercial use:

*Formula 5*

Calcined gypsum tube milled to medium plasticity _____ 94.894%
Powdered gum arabic _____ 2.000
Soda ash (Na$_2$CO$_3$)—100 mesh _____ .100
Commercial retarders—100 mesh _____ .006
Powdered litharge (PbO) _____ 3.000

Such a plaster when mixed with 35 cc. of water per 100 grams of plaster will set in from 15 to 30 minutes and will have a lineal setting expansion of less than .20%. This is less than the lineal expansion found with ordinary casting plasters requiring 65 cc. of water to produce pouring consistency, it being understood that the expansion decreases with the amount of water used. When such a plaster is first made the setting expansion apparently is less than when it has been stored for a period of time. It is therefore advisable, if a low expansion ratio is desired, to store the plaster in air tight containers when the plaster is not to be used soon after manufacture. In some cases, such increase in expansion ratio is not objectionable and the plaster may be handled in the usual manner in paper bags. With the composition plaster of my invention I therefore can produce the range of expansion ratios desired while obtaining improvement, that is, reduction of expansion, for most casting purposes.

In some cases I have found that the addition to either the normal calcined product or to tube milled calcined gypsum of gum arabic and litharge alone without the addition of soda ash is desirable as such a composition results in a less viscous mass and may be desirable in certain uses, although the testing consistency and the pouring consistency of such a plaster may be somewhat higher than when the soda is also used.

The casts resulting from the plaster of the compositions utilizing litharge and gum arabic and the alkaline material are harder and stronger than those made from gum arabic and lime as proposed in my prior application Serial No. 554,068. Moreover, the expansion ratio of the plaster of such casts is less than that of the compositions of my prior application. Also the plasters using the litharge, gum arabic and alkaline material are less subject to change in the water carrying capacity when stored or when exposed to atmosphere.

Examples of other alkaline materials which according to my invention I have found may be used with the litharge and the gum arabic to produce the results above described are given in the following table which shows also for the different percentages of said alkaline materials the pouring consistency which may be obtained with the plaster utilized in Formula No. 5 for which the pouring consistency of the plaster before tube milling is 62 and for which the pouring consistency after tube milling is 78 as shown in the comparative tabulation given above. The following table shows the pouring consistencies which are obtained when the different alkaline materials are substituted for the soda ash as given in the formula, that is, by comparison with the figure 78 the reduction in the amount of water required to produce pouring consistency.

| Substituted alkaline material | | Pouring consistency |
|---|---|---|
| | Per cent | |
| Soda ash | 0.1 | 35 |
| Potassium hydroxide, KOH | 0.05 | 38 |
| Sodium hydroxide, NaOH | 0.05 | 39 |
| Calcium oxide, CaO | 0.1 | 38 |
| Calcium hydroxide, Ca(OH)$_2$ | 0.1 | 38 |
| Ammonia (concentrated), NH$_4$OH | 0.1 | 39 |
| Barium hydroxide, Ba(OH)$_2$ | 0.1 | 39 |
| Barium oxide, BaO | 0.5 | 40 |
| Magnesium hydroxide, Mg(OH)$_2$ | 0.5 | 42 |
| Borax, Na$_2$B$_4$O$_7$ | 1.0 | 41 |
| Hexamethylenamine | 0.5 | 41 |
| Potassium carbonate, K$_2$CO$_3$ | 0.1 | 35 |

When the soda ash is omitted from Formula 5 the pouring consistency obtained is 45.

Certain materials may be added to the composition of the type using litharge and soda ash for decreasing the setting time. For example, small amounts of the acid salt of aluminum sulphate or of potassium sulphate may be added to decrease the setting time without noticeably changing the property of low water carrying capacity.

In addition to the materials which I have indicated as producing the above described results according to my invention, as mentioned above I may utilize for various purposes to give particular properties to the cast or to the hydrated calcined gypsum product, fillers of various kinds. While some of these fillers have been heretofore used in mixtures with calcined gypsum for various purposes, I have found that the agents which I use according to my invention to decrease the water carrying capacity of calcined gypsum are also effective to lower the water carrying capacity of these admixed fillers. These admixed materials themselves when mixed with calcined gypsum have the effect of modifying, either increasing or decreasing, the water carrying capacity of the calcined gypsum, and I may use these materials thus to modify the water carrying capacity of my composition plaster, as well as for the other well known purposes, such as controlling the physical characteristics of the mortar or slurry which influence its workability when used for making the cast, or of the cast itself. In all cases, however, the agents which I use according to my invention, namely, the saccharides and alkalies such as gum arabic and lime and the like, and also the lead compound and the alkaline material such as litharge and soda ash, are effective to lower the water carrying capacity not only of the gypsum but of the admixed fillers and also of the mixture. This feature makes possible a control of the water carrying capacity of composition plasters while retaining the advantages obtained by the admixture of the fillers. These admixed fillers may be mixed with the calcined gypsum before or after the addition of the gum arabic and hydrated lime or of the other substances suitable for carrying out the purpose of my invention.

For the purpose of modifying the properties of flow or self-leveling, mobility, yield value, plasticity or viscosity or other purpose, I have found that it may be desirable to mix with the composition casting plaster of my invention certain fibrous fillers such as asbestos, wood fiber, agolite talc or similar materials, or I may utilize such inert materials as diatomaceous earth, clay, sand, mica, platy talc and silex or ground silica. For example, to make the wet mix less sticky and less viscous and to make it more plastic and more workable for certain purposes, while securing the improvement in the water carrying capacity by the method of my invention, I have found that the admixture of silex and asbestos or of wood fiber alone is effective. Or, for certain purposes such as investment plasters used in dental work, I may use an admixture of silex alone which will further reduce the water carrying capacity of the casting plaster made according to my invention as well as produce an increased density of the cast, thereby decreasing the tendency of the mold to distort under the heat applied to melt the model or under the heat of the molten metal poured into the mold. In all such compositions, however, the calcined gypsum is the predominant material and is relied upon to provide the cementitious quality necessary in a casting plaster.

While the increase of hardness or density in itself improves the resistance to water and moisture of the cast made from the calcined gypsum composition plaster of my invention, to increase this property still further I have found it advantageous in some cases to incorporate in the mixture various water-proofing and moisture resisting agents. For this purpose I have used a water insoluble metallic soap and as an example of this class of water-proofing compounds, usually designated as integral water-proofing compounds and usually mixed with gypsum before admixture with water, the stearates of calcium, aluminum and zinc may be mentioned. In other cases I have found it effective to incorporate in the plaster such water resisting compounds as asphalt, wax and oil emulsions. All such combinations are within the scope of my invention and I do not wish to be limited to the particular fillers or to the water and moisture resisting agents which I have mentioned for incorporation with the composition casting plaster of my invention. However, I do not utilize any materials as fillers or as water-proofing agents which may react with the saccharide or with the alkaline material or which otherwise interfere with the result produced by the combination with calcined gypsum of said two broadly classified materials of my invention.

What is claimed as new is:

1. A dry mixture for use as a plaster comprising calcined gypsum in amount not substantially less than 75% by weight of the dry mixture and sufficient to act substantially alone as the cementitious material, an alkaline material and a saccharide, the alkaline materials in the mixture being selected from a group consisting of the alkalies, the alkaline carbonates and the alkaline borates, the saccharide being present in amount not substantially greater than 3% by weight of the mixture of said three ingredients and not substantially less than the alkaline material.

2. A dry mixture for use as a plaster comprising calcined gypsum, a saccharide and an alkaline material the percentage of the calcined gypsum being not substantially less than about 75%, the percentages of the saccharide and of the alkaline material each being not greater than about 3% and being based on the sum of the amounts by weight of said three ingredients of the plaster, the alkaline material being present in amount not greater than the saccharide, said mixture containing no other ingredient capable of producing a chemical reaction in the mixture.

3. A dry mixture for use as a plaster composed of calcined gypsum in predominant amount, lime and a small percentage of gum arabic, the percentage of the gum arabic being not substantially less than that of the lime.

4. A mixture for use as a casting plaster comprising calcined gypsum, a small percentage but at least .4% of gum arabic, and between .2 and 3.0% of an alkaline material selected from a group composed of the alkalies, the alkaline carbonates and the alkaline borates, the amount of the gum arabic being not substantially less than that of the alkaline material, said percentages being based on the dry weight of said three ingredients.

5. A mixture comprising calcined gypsum in predominant amount, a saccharide and an alkaline material, the relation of the quantity of the saccharide to the quantity of the alkaline material in the mixture being between 1 to 1 and 4 to 1.

6. A mixture comprising calcined gypsum, a saccharide, and an alkaline material, the alkaline materials in the mixture being selected from a group consisting of the alkalies, the alkaline carbonates and the alkaline borates, the calcined gypsum being present in amount not substantially less than 75%, the saccharide being present in amount substantially between .4% and 10%, the alkaline material being present in amount not substantially greater than the saccharide, said percentages being based on the sum of the weights of said three ingredients as a dry mixture.

7. A mortar or slurry comprising a mixture with water of a composition plaster as defined in claim 6.

8. A cast comprising a hydrated and set plaster of the composition defined in claim 6.

9. The method of preparing a casting plaster which comprises mixing calcined gypsum, gum arabic and lime, and maintaining the calcined gypsum in predominant amount and sufficient to cause it to act substantially alone as the cementitious material and maintaining the relation of the gum arabic to the lime at between 1 to 1 and 4 to 1 while limiting the amount of the gum arabic to an amount not substantially greater than 3%.

10. A dry mixture for use as a casting plaster comprising calcined gypsum in amount not substantially less than 75% by weight of the dry mixture, a saccharide and a lead compound.

11. A mixture for use as a casting plaster comprising calcined gypsum in predominant amount, a saccharide, a lead compound and an alkaline material, said mixture containing no other ingredients which produce a chemical reaction within the mixture.

12. A dry mixture comprising calcined gypsum in amount not substantially less than 75% by weight of the dry mixture, gum arabic and litharge.

13. A dry mixture comprising calcined gypsum in amount not substantially less than 75% by weight of the dry mixture, gum arabic, litharge and sodium carbonate, the amount of the litharge being between .5% and 10% by weight of the dry mixture.

14. A mixture for use as a casting plaster comprising calcined gypsum in predominant amount, gum arabic in amount between .5% and 10% litharge in amount between .5% and 10%, and an alkaline material between .01% and 2%, said percentages being based on the sum of the amounts by weight of said ingredients in the mixture.

15. A mixture comprising plasticized calcined gypsum, a saccharide and a lead compound.

16. A mixture comprising calcined gypsum of greater plasticity than that in its state upon completion of the calcining operation alone, gum arabic, a lead compound and an alkaline material.

17. A mixture comprising tube milled calcined gypsum, gum arabic, litharge and an alkaline material.

18. The method of reducing the water carrying capacity of a plaster of calcined gypsum which comprises the steps of increasing the plasticity of the calcined gypsum and adding to the calcined gypsum a saccharide and a lead compound.

19. The method of reducing the water carrying capacity of a plaster of calcined gypsum which comprises subjecting the calcined gypsum to a process to increase its plasticity and adding to the plasticized product a saccharide, a lead compound and an alkaline material.

20. The method of reducing the water carrying capacity of a plaster of calcined gypsum which comprises subjecting the calcined gypsum to a process to increase its plasticity and adding to the plasticized product gum arabic, litharge and an alkaline material.

21. A mixture comprising calcined gypsum in amount not substantially less than 75%, a saccharide, and a lead compound in amount between .5% and 10%, said percentages being based on the sum of the amounts by weight of said three ingredients of the mixture.

22. A mixture comprising calcined gypsum in amount not substantially less than 75%, a saccharide, and a lead compound in amount between .5% and 10%, said percentages being based on the sum of the amounts by weight of said three ingredients of the mixture, and an alkaline material in amount not substantially greater than 3% based on the weight of said four ingredients of the mixture.

23. A mixture comprising calcined gypsum, a saccharide and an alkaline material, the alkaline materials in the mixture being selected from a group consisting of the alkalies, the alkaline carbonates and the alkaline borates, the amount of the calcined gypsum being not substantially less than 75% by weight based on the sum of the weights of said three ingredients, the amount of the alkaline material being not substantially greater than that of the saccharide.

24. A mixture comprising calcined gypsum, a saccharide and an alkaline material, said mixture being formed with the saccharide in amount not substantially greater than 10% but not substantially less than the percentage of the alkaline material, said percentages being based on the sum of the weights of said three ingredients, the amount of the saccharide and the amount of the alkaline material being in proportions capable of producing with water a mortar or slurry of pouring consistency which, when set, has a compressive strength in excess of 2500 pounds per square inch.

25. A mixture comprising calcined gypsum, a saccharide, and an alkaline material, the amount of the saccharide in said mixture being not substantially greater than 10% and not substantially less than the percentage of the alkaline material, said percentages being based on the sum of the weights of said three ingredients, the amount of the saccharide and the amount of the alkaline material being in such proportions in relation to each other as to require less than 50 parts of water per 100 parts of dry mixture to produce a mortar or slurry of pouring consistency.

26. A mixture comprising calcined gypsum in predominant amount, a saccharide and an alkaline material, the alkaline material in the mixture being selected from a group consisting of the alkalies, the alkaline carbonates and the alkaline borates, the percentage of the saccharide being between .4% and 10.0% and the percentage of the alkaline material being between .01% and 3.0%, the percentage of the saccharide being not substantially less than that of the alkaline material.

27. A mixture comprising calcined gypsum in predominant amount, a saccharide and an alkaline material, the alkaline material in the mixture being selected from a group consisting of the alkalies, the alkaline carbonates and the alkaline borates, the percentage of the saccharide being between .4% and 10.0% and the percentage of the alkaline material being between .01% and 3.0%, said mixture containing no other ingredient capable of producing a chemical reaction within the mixture.

28. A mixture comprising commercial calcined gypsum, a saccharide and a lead compound, the amount of the commercial calcined gypsum being not substantially less than 90% by weight of the sum of said three ingredients.

29. A mixture comprising calcined gypsum, a saccharide, and an alkaline material, the alkaline materials in the mixture being selected from a group consisting of the alkalies, the alkaline carbonates and the alkaline borates, the percentage of the saccharide being substantially between .4% and 10%, the percentage of the alkaline material being not substantially less than .01% and not substantially greater than the percentage of the saccharide, said percentages being based on the sum of the weight of said three ingredients as a dry mixture.

30. A mixture comprising calcined gypsum, a saccharide, and an alkaline material, the alkaline materials in the mixture being selected from a group consisting of the alkalies, the alkaline carbonates and the alkaline borates, the saccharide being present in amount not substantially greater than 3% and not substantially less than the amount of the alkaline material, said percentages being based on the sum of the weights of said three ingredients as a dry mixture.

31. A mixture for use as a plaster comprising calcined gypsum, gum arabic, and an alkaline material selected from a group composed of the alkalies, the alkaline carbonates and alkaline borates, the percentage of the calcined gypsum being not substantially less than 75% based on the sum of the weights of said three ingredients as a dry mixture.

32. A mixture for use as a plaster comprising calcined gypsum, gum arabic, and an alkaline material selected from a group composed of the alkalies, the alkaline carbonates and alkaline borates, the percentage of the calcined gypsum being not substantially less than 75% based on the sum of the weights of said three ingredients as a dry mixture, the percentage of gum arabic being not substantially less than that of the alkaline material.

33. A mixture comprising calcined gypsum, gum arabic, and an alkaline material selected from a group composed of the alkalies, the alkaline carbonates and alkaline borates, the amount of the calcined gypsum being not substantially less than 75%, the amount of the gum arabic being not substantially less than .4%, said percentages being based on the sum of said three ingredients as a dry mixture.

34. A mixture comprising calcined gypsum, gum arabic, and an alkaline material selected from a group composed of the alkalies, the alkaline carbonates and alkaline borates, the amount of the gum arabic being substantially between .4% and 10%, the amount of the alkaline material being not substantially greater than that of the gum arabic, said percentage being based on the sum of the weights of said three ingredients as a dry mixture.

35. A mixture comprising calcined gypsum, gum arabic, and an alkaline material selected from a group composed of the alkalies, the alkaline carbonates and alkaline borates, the percentage of the gum arabic being substantially between .4% and 10%, the percentage of the calcined gypsum being of the degree of 90%, said percentages being based on the sum of the weights of said three ingredients as a dry mixture.

36. A mixture comprising calcined gypsum, a saccharide, and a lead compound, the amount of the saccharide being substantially between .5% and 10%, the amount of the lead compound being substantially between .5% and 10%, said percentages being based on the sum of the weights of said three ingredients as a dry mixture.

37. A mixture comprising calcined gypsum, a saccharide, a lead compound, and an alkaline material, the amount of the alkaline material being not substantially greater than that of the saccharide.

38. A mixture comprising calcined gypsum, gum arabic, a lead compound, and an alkaline material, the amount of the calcined gypsum being not substantially less than 75% based on the sum of the weights of said four ingredients, the amount of the alkaline material being not substantially greater than that of the gum arabic.

39. A mixture comprising calcined gypsum, gum arabic, litharge and an alkaline material.

40. A mixture comprising plasticized calcined gypsum and a saccharide.

41. A mixture comprising plasticized calcined gypsum, a saccharide and an alkaline material.

42. A mixture comprising plasticized calcined gypsum, gum arabic and a lead compound.

43. A mixture comprising calcined gypsum, a saccharide and an alkali, the relation of the quantity of the saccharide to the quantity of alkali in the mixture being substantially between 2 to 1 and 4 to 1.

44. A mixture comprising calcined gypsum, gum arabic and an alkaline material, the relation of the gum arabic to the quantity of the alkaline material being substantially between 1 to 1 and 4 to 1.

45. The process of producing calcined gypsum of low water carrying capacity which comprises calcining gypsum to produce the calcined gypsum, causing the plasticity of the calcined gypsum to be greater than that of the product of calcination alone, and causing a saccharide to become mixed with said calcined gypsum of increased plasticity.

46. The process of producing calcined gypsum of low water carrying capacity which comprises calcining gypsum to produce the calcined gypsum, causing the plasticity of the calcined gypsum to be greater than that of the product of calcination alone, and causing to become mixed with said calcined gypsum of increased plasticity gum arabic and an alkaline material.

47. The process of producing calcined gypsum of low water carrying capacity which comprises calcining gypsum to produce the calcined gypsum, causing the plasticity of the calcined gypsum to be greater than that of the product of calcination alone, and causing to become mixed with said calcined gypsum of increased plasticity gum arabic and a lead compound.

48. A mixture comprising calcined gypsum, gum arabic, a lead compound and an alkaline material.

HARRY F. GARDNER.